United States Patent [19]

Tsuda et al.

[11] Patent Number: 5,877,226
[45] Date of Patent: Mar. 2, 1999

[54] THERMAL INSULATING FOAMED MATERIAL HAVING CARBON DIOXIDE ADSORBENTS AND METHOD FOR MANUFACTURING THE SAME

[75] Inventors: Yoshiyuki Tsuda, Ikeda; Kazutaka Uekado, Nishinomiya; Hideo Nakamoto, Osaka; Tomohisa Tenra, Yao; Tsukasa Takushima, Higashiosaka, all of Japan

[73] Assignee: Matsushita Refrigeration Company, Higashiosaka, Japan

[21] Appl. No.: 67,519

[22] Filed: Apr. 28, 1998

Related U.S. Application Data

[62] Division of Ser. No. 599,451, Jan. 22, 1996.

[30] Foreign Application Priority Data

| Jan. 24, 1995 | [JP] | Japan | 7-009073 |
| Jan. 24, 1995 | [JP] | Japan | 7-009074 |
| Nov. 7, 1995 | [JP] | Japan | 7-288328 |

[51] Int. Cl.$^6$ .................................................. C08G 18/00
[52] U.S. Cl. ........................ 521/76; 521/57; 521/109.1; 521/125
[58] Field of Search ............... 521/76, 57, 109.1, 521/125

[56] References Cited

U.S. PATENT DOCUMENTS

| 3,024,209 | 3/1962 | Ferrigno . | |
| 4,154,364 | 5/1979 | Hagiwara et al. . | |
| 4,821,914 | 4/1989 | Owen et al. . | |
| 5,091,233 | 2/1992 | Kirby et al. . | |
| 5,371,113 | 12/1994 | Ward, III et al. | 521/124 |
| 5,375,423 | 12/1994 | Delatte . | |
| 5,397,809 | 3/1995 | Ward, III et al. | 521/130 |
| 5,413,848 | 5/1995 | Jaster et al. | 521/97 |
| 5,567,739 | 10/1996 | Ward, III | 521/123 |

FOREIGN PATENT DOCUMENTS

| 0 424 539 A1 | 5/1991 | European Pat. Off. . |
| 0 617 068 A3 | 9/1994 | European Pat. Off. . |
| 0 618 253 A1 | 10/1994 | European Pat. Off. . |
| 2-248437 A | 10/1990 | Japan . |
| 3-031332 A | 2/1991 | Japan . |
| 3-045635 A | 2/1991 | Japan . |

*Primary Examiner*—Morton Foelak
*Attorney, Agent, or Firm*—Panitch Schwarze Jacobs & Nadel, P.C.

[57] ABSTRACT

A thermal insulating foamed material is a polyurethane foam having closed cells, and produced by mixing, agitating and foaming a polyol, a polyisocyanate, a foam stabilizer, a catalyst, a blowing agent and a carbon dioxide adsorbent. The carbon dioxide adsorbent is produced by mixing and granulating powders of at least one member of alkali metal hydroxides and alkaline-earth metal hydroxides and organic or inorganic powders having a water absorbing property and soaked with water in advance, and formed by a resin film, such as a methacrylic acid ester, which is permeable to carbon dioxide but hardly permeable to water.

20 Claims, 3 Drawing Sheets

THERMAL INSULATING FOAMED MATERIAL HAVING CARBON DIOXIDE ADSORBENTS AND METHOD FOR MANUFACTURING THE SAME

CROSS REFERENCE TO RELATED APPLICATION

This application is a division of copending application Ser. No. 08/599,451, filed Jan. 22, 1996, entitled Thermal Insulating Foamed Material Having Carbon Dioxide Adsorbents and Method for Manufacturing the Same. The entire disclosure of application Ser. No. 08/599,451 as filed is incorporated herein by reference.

FIELD OF THE INVENTION AND RELATED ART STATEMENT

1. Field of the Invention

The present invention relates to a thermal insulating foamed material having carbon dioxide adsorbents and being for use in refrigerators, freezers and the like, and a method for manufacturing the thermal insulating foamed material as well as a thermal insulation cabinet using the thermal insulating foamed material.

2. Description of the Prior Art

Recent years, in this field there have been needs of decrease in thermal conductivity and improvement in thermal insulation of thermal insulating foamed materials from a viewpoint of energy-saving. And, concurrently, the environmental disruption, such as ozone depletion, global warming and so on by increase of chlorofluorocarbon (hereinafter abbreviated as CFC) and a hydrochlorofluorocarbon (hereinafter abbreviated as HCFC) are becoming problems. Therefore, in this technical field, it has been very important to meet the above-mentioned needs and to solve these problems.

Accordingly, in the production of rigid polyurethane foam as a typical thermal insulating foamed material, it has been considered to decrease the amount of CFC and HCFC to be used, completely removing the ozone depletion, and to use a blowing agent which is less effective to the global warming. Various forming techniques using a hydrocarbon (hereinafter abbreviated as HC), such as pentane or cyclopentane, as such blowing agent, are now under examination.

In order to improve thermal insulating ability of the rigid polyurethane foam (hereinafter abbreviated as foam), it is basically important to decrease gaseous thermal conductivity of a gaseous composition in closed cells in the foam. Therefore, it has been considered to be an effective measure to fill the cells in the foam with a gas having a lower gaseous thermal conductivity.

For the purposes of a decrease in the amount of blowing agent to be used, a problem of undesirable solubility between the blowing agent and the resinous material, and an improvement of properties of the foam such as a density and so on of the foam, it has been needed to use carbon dioxide generated by a reaction of a polyisocyanate and water as a blowing agent for the production of the foam.

However, since carbon dioxide having a high gaseous thermal conductivity remained in cells in the foam containing carbon dioxide as well as the HC as the blowing agent, the thermal insulating ability of a thermal insulating foamed material was inevitably bad.

As a means of solving these problems, the gazette of the Japanese unexamined patent application (TOKKAI) sho 57-49628, for example, proposed a method in which carbon dioxide composition was removed by carbon dioxide adsorbents. In this method, an adsorbent composed of zeolite and others was mixed in advance into the resinous material, the carbon dioxide generated by a carbodiimide forming reaction, an isocyanurate forming reaction or the like was adsorbed by the carbon dioxide adsorbent and thus cells were filled with HC of a blowing agent alone.

Accordingly, the invention of the manufacturing method using the zeolite as the above-mentioned carbon dioxide adsorbent, which is disclosed in the above-mentioned gazette of the Japanese unexamined patent application (TOKKAI) sho 57-49628 removes water, which was a primary factor for carbon dioxide generation in the isocyanate polymerization foam, from the raw material, and carbon dioxide generated during the forming step affording the foam and remained in the cells was removed absorptively. Thus, in this thermal insulating foamed material, it was attempted to improve the thermal insulating ability of the foam by removing the carbon dioxide in the cells. In this invention, the "thermal insulating foamed material" means a foamed substance or matter which contains a large number of small foams made by a blowing agent and used to insulate heat.

In the thermal insulating foamed material formed by the above-mentioned conventional manufacturing method JP-A-57-49628, the carbon dioxide adsorbent composed of zeolite and others preferentially adsorbs water over carbon dioxide. Therefore, water is adsorptively removed upon mixing of the raw materials. This means that there is no ureaforming reaction, a reaction of an organic isocyanate with water, which is effective for reducing density of the foam to improve the thermal insulating ability. Accordingly, the thermal insulating foamed material is formed from a dehydrated material, which results in a formation of a high density foam having a deteriorated thermal insulating ability as seen in sole foaming by a blowing agent.

As already discussed cyclopentane is completely free from a possibility of causing the ozone depletion and has very little effect to the global warming. It has hitherto been considered to utilize cyclopentane or the like as a blowing agent for the thermal insulating foamed material. The cyclopentane as a composition of the blowing agent, however, is scarcely soluble in polyetherpolyols which are commonly used materials for rigid polyurethane foam. Therefore, the amount of cyclopentane to be mixed into a premix was limited.

Besides, the cyclopentane has a boiling point of 49.3° C., which is very high as compared with 23.8° C. of CF11 or 32.0° C. of HCFC141b, which are conventionally used blowing agents with a boiling temperature around ordinary temperature. Therefore, in order to improve the expansion ratio of the foam, increase in the amount of water to be added is essential for generating the carbon dioxide as compared with the conventional case in which CFC11 or HCFC141b is used as the blowing agent.

In the prior art method, however, water in the raw material is removed by the carbon dioxide adsorbent upon mixing of the premix. Therefore, there is such an unsolved problem that the expansion ratio of the foam is greatly decreased and that the foam having a low density having high thermal insulating ability can not be produced when cyclopentane in need of water or the like is used as the blowing agent.

It may be considered to use, as the carbon dioxide adsorbent, an alkali metal hydroxide which has low water absorbing properties and which is excellent in adsorbing properties for carbon dioxide as compared with zeolite and the like. In this case, however, there is also a problem that, while the removal of water in the raw material is decreased, adsorbing properties for carbon dioxide can not be effectively exerted after the forming, i.e. in the foam after water is removed, due to the fact that alkali metal hydroxide exhibits adsorbing properties for carbon dioxide only in the presence of water.

Accordingly, in this technical field, even if the hydrocarbon etc. is used as the blowing agent, there are yet needs for developing a thermal insulating foamed material of high quality and excellent in giving thermal insulating ability to the foam, while retaining the expansion ratio of a foam as ever.

OBJECT AND SUMMARY OF THE INVENTION

The principal object of the present invention is to solve the above-mentioned problems and to protect the global environment. Thus, the present invention provides a thermal insulating foamed material of high quality, excellent in thermal insulating ability of the foam as ever, while retaining the expansion ratio of the foam, by using a volatile material as the blowing agent, such as a hydrocarbon and the like completely free from a possibility of causing the ozone depletion and having a very little possibility of causing the global warming. The present invention also provides a method for manufacturing thermal insulating foamed material and a thermal insulation cabinet using the thermal insulating foamed material.

In order to solve the above-mentioned problems, a thermal insulating foamed material in accordance with the present invention comprises a foamed polyurethane resin composition having closed cells, which has therein carbon dioxide adsorbents formed by at least one member of carbonates of alkali metal and carbonates of alkaline-earth metal, covered with resin coating, and has volatile blowing agent in the closed cells.

A thermal insulation cabinet with excellent thermal insulating properties is obtained by filling a space formed between a first wall member and a second wall member with a foamed polyurethane resin composition, has therein carbon dioxide adsorbents, formed by at least one member of carbonates of alkali metal and carbonates of alkaline-earth metal, covered with resin coating, and has volatile blowing agent in closed cells of the foamed polyurethane resin composition.

A method for manufacturing a thermal insulating foamed material in accordance with the present invention comprises steps of producing carbon dioxide adsorbents, which include at least one member of hydroxides of alkali metal and hydroxides of alkaline-earth metal and water, and coated with a coating resin film, mixing the carbon dioxide adsorbents with polyol, catalyst, foam stabilizer, water, volatile blowing agent and polyisocyanate, producing a foamed polyurethane resin composition having closed cells including carbon dioxide generated by reaction between water and polyisocyanate, and volatile blowing agent, and adsorbing the carbon dioxide in the closed cells of the foamed polyurethane resin composition by the carbon dioxide adsorbents, so as to despite carbonates and substantially fill the cells with the volatile blowing agent.

According to a further aspect of the present invention, the manufacturing method for thermal insulating foamed material uses a carbon dioxide adsorbent produced by mixing and granulating powders of an alkali metal hydroxide or the like having a lower water absorbing properties and organic or inorganic materials having a water absorbing properties and soaked with water in advance, and coating the surface of the granulated material with a resin which is permeable to carbon dioxide but hardly permeable to water, or a carbon dioxide adsorbent produced by granulating powders of an alkali metal hydroxide or the like containing water, and coating the surface of the granulated material with a resin which is permeable to carbon dioxide but hardly permeable to water. Therefore, the carbon dioxide adsorbent does not adsorb water in the materials.

Accordingly, the expansion ratio of the foam is not decreased and lowering of the density of the foam becomes possible. Further, since the powders of the alkali metal hydroxide or the like are in a state contacting with a substance soaked with water or the like, they can exert carbon dioxide adsorbing ability in the foam after losing water.

Furthermore, since the carbon dioxide adsorbent is coated by the resin film which is permeable to carbon dioxide but hardly permeable to water, the water carried by the carbon dioxide adsorbent has no effect on the foaming action and, in addition, there is no fear of diffusing water newly generated in the course of the reaction of the alkali metal hydroxide absorbing carbon dioxide. Accordingly, the properties of the foam such as the density or the like are not adversely affected, and the carbon dioxide in the cells is removed allowing improvement of thermal insulating properties of the foam.

While the novel features of the invention are set forth particularly in the appended claims, the invention, both as to organization and content, will be better understood and appreciated, along with other objects and features thereof, from the following detailed description taken in conjunction with the drawings.

Figure 1:
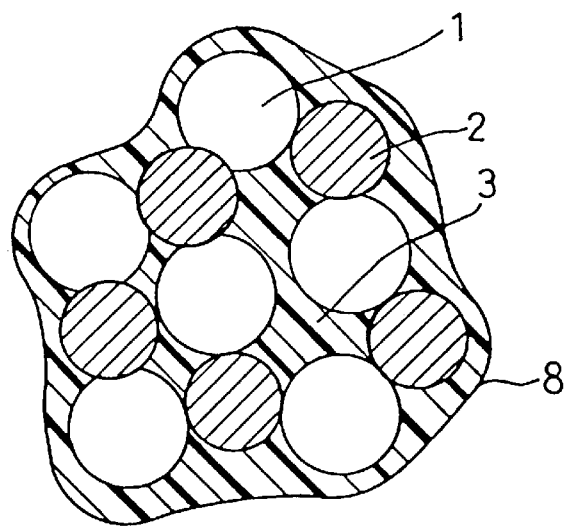
FIG. 1 shows a schematic view of a carbon dioxide adsorbent mentioned in Example 2 of the present invention.

It will be recognized that some or all of the Figures are schematic representations for purposes of illustration and do not necessarily depict the actual relative sizes or locations of the elements shown.

DESCRIPTION OF THE PREFERRED EMBODIMENTS

In the following will be mentioned embodiments of a thermal insulating foamed material having carbon dioxide adsorbents, a method for manufacturing said thermal insulating foamed material and a thermal insulation cabinet having said thermal insulating foamed material of the present invention.

The thermal insulating foamed material as will be seen in Example 1 in accordance with the present invention is rigid polyurethane foam. The rigid polyurethane foam is formed by mixing and agitating a polyisocyanate and a premix composition formed by mixing a polyol, a foam stabilizer, a catalyst, a blowing agent including water and a carbon dioxide adsorbent. The carbon dioxide adsorbent is produced by mixing and granulating at least one member of an alkali metal hydroxide and an alkaline-earth metal hydroxide and organic or inorganic powders, which have a water absorbing property and are soaked with water in advance, and the surface of the grains of mixture is coated with a resin which is permeable to carbon dioxide but hardly permeable to water. Alternatively, the carbon dioxide adsorbent is produced by granulating powders of at least one member of an alkali metal hydroxide and an alkaline-earth metal hydroxide using an organic or inorganic substance containing water as a binder, and coating the surface of the granulated material with a resin which is permeable to carbon dioxide but hardly to permeable to water.

The organic solution of the resin for coating the surface of the carbon dioxide adsorbent is a solution of high molecular substance dissolved in water or an organic solvent (for example, alcohols such as methanol, ethanol or the like, toluene, xylene, methylene chloride and the like). The high molecular substance includes, for example, polyvinyl alcohol, polyvinyl acetate, polyvinyl pyrrolidone, polyacrylic acid ester, polymethacrylic acid ester, ethyl cellulose, carboxymethyl ethyl cellulos and the like. The viscosity of such solution is preferably 500 cp or less at a temperature in a granulating step in view of limitation of the wet spray coating in the granulating step. It is preferred that the concentration of the solution is about 2–40 wt % from the practical view point.

The outer dimension of the granulated carbon dioxide adsorbent in the rigid polyurethane foam (hereinafter abbreviated as foam) are preferably from 0.2 to 1.0 mm, of which the lower limit is a limit of granulation and the upper limit is a dimension which does not inhibit formation of cells upon urethane foaming.

The carbon dioxide adsorbent as will be seen in Example 2 in accordance with the present invention is in the form of grains of mixture produced by mixing and granulating at least one member of an alkali metal hydroxide and an alkaline-earth metal hydroxide and a hydrate of inorganic compound, for example, a hydrate having a heat of hydration of 20 kcal/mol or more. The carbon dioxide adsorbent is formed by coating the surface of the granulated material with a resin which is permeable to carbon dioxide but hardly permeable to water. The powders such as alkali metal hydroxide or the like include water, as water in the hydrate, which is essential for adsorbing carbon dioxide, and protected by the resin coating. Therefore, they can exert an ability of adsorbing carbon dioxide even in a system free from water. Further, when a hydrate of inorganic compound having a heat of hydration of 20 kcal/mol or more is mixed, water does not evaporate particularly in a granulating step at the ordinary temperature. Therefore, the carbon dioxide adsorbent sufficiently exerts an ability of adsorbing carbon dioxide.

A thermal insulating foamed material as well as be seen in Example 3 in accordance with the present invention is manufactured, in the mixing and agitation of raw materials for the foam and the carbon dioxide adsorbent, by first mixing the polyol, the catalyst, the foam stabilizer, the material containing at least water as a composition for the blowing agent so as to form a premix. Then, the premix is mixed with the polyisocyanate and the carbon dioxide adsorbent film-coated by the resin which is permeable to carbon dioxide but hardly permeable to water thereby manufacturing the foam.

The carbon dioxide adsorbent is produced by soaking an inorganic compound containing at least one member of an alkali metal hydroxide and an alkaline-earth metal hydroxide with 1 milli-molar equivalent or more of water based on the total molar amount of the alkali metal hydroxide and the alkaline-earth metal hydroxide in advance.

According to the method for manufacturing the thermal insulating foamed material of the present invention, the carbon dioxide adsorbent was present in the raw materials only in a very short duration. Accordingly, even the carbon dioxide adsorbent having a strong catalytic activity is used, a stable foaming can be performed and a thermal insulating foamed material of high quality is obtained without problems such as abnormal reactions.

As mentioned above, since the carbon dioxide adsorbent in the thermal insulating foamed material has at least one member of the alkali metal hydroxide and the alkaline-earth metal hydroxide and is soaked with water in advance, the carbon dioxide adsorbent can adsorb and remove carbon dioxide when placed in a carbon dioxide atmosphere, owing to the facts that the reaction with carbon dioxide proceeds fast by a catalytic action of water thereby depositing carbonate. Since the carbon dioxide adsorbent is soaked with water in advance, the alkali metal hydroxide or the alkaline-earth metal hydroxide easily reacts for a long period with carbon dioxide in the polyurethane thermal insulating foamed material even in an air-tight and anhydrous conditions as seen in the polyurethane thermal insulating foamed material.

Further, since the carbon dioxide adsorbent is uniformly dispersed and distributed in the thermal insulating foamed material, a distance in which carbon dioxide in the cells in the thermal insulating foamed material travels towards the carbon dioxide adsorbent is very short and hence carbon dioxide can be adsorbed and removed within a short time.

In addition, since the carbon dioxide adsorbent is film-coated by a resin, unnecessary urea forming reaction does not occur between the polyisocyanate and the carrying water of the carbon dioxide adsorbent during the mixing process of the raw materials.

Still, since carbon dioxide takes some time for passing through the resin of the carbon dioxide adsorbent, the carbon dioxide adsorbent does not adsorb carbon dioxide which is acting as a propulsive force for expanding during foaming. Therefore, no decrease in expansion ratio is resulted in the thermal insulating foamed material having carbon dioxide adsorbents.

Accordingly, the carbon dioxide adsorbent does not adversely affect during the foaming process after mixing urethane materials but does adsorb and remove unnecessary carbon dioxide after curing of the urethane resin. By this action, the carbon dioxide in the cells of urethane resin is removed and hence the thermal insulating foamed material in accordance with the present invention is improved in thermal insulating ability.

As the volatile blowing agents used in the method for manufacturing the thermal insulating foamed material, can be used hydrocarbon blowing agents such as cyclopentane, n-pentane and the like or hydrofluorocarbon blowing agents such as HFC-356mmf, HFC-245fa and the like.

Further, the thermal insulation cabinet of the present invention comprises a box-shaped outer shell as the first wall member, a box-shaped inner shell as the second wall member and the above-mentioned thermal insulating foamed material filled in a space between said box-shaped outer shell and said box-shaped inner shell.

In the thermal insulation cabinet, since the carbon dioxide adsorbent is uniformly dispersed in the thermal insulating foamed material, the carbon dioxide adsorbent has no adverse effect, such as deformation, on the external appearance of the thermal insulation cabinet. Therefore, the thermal insulation cabinet of the present invention is excellent in thermal insulation properties and of high quality in external appearance.

As mentioned above, according to the present invention, it is possible to obtain a thermal insulation material and a thermal insulation cabinet which have no problem in mass production and quality and can contribute towards the global environment protection, using the thermal insulating foamed material in which a blowing agent mainly comprises carbon dioxide completely free from a possibility of causing the ozone depletion and having a very little possibility of causing the global warming.

EXAMPLE 1

The thermal insulating foamed material having the carbon dioxide adsorbents, and the thermal insulation cabinet using said thermal insulating foamed material of Example 1 in accordance with the present invention are specifically mentioned below. In the below-mentioned Embodiments, a foamed rigid polyurethane foam as the thermal insulating foamed material is abbreviated as foam.

Table 1 shows the compositions of raw materials for the foam in Example 1 and Comparative Examples 1 to 3, and properties of the manufactured foam, i.e. density, thermal conductivity and composition of gas in cells.

The carbon dioxide adsorbent in Example 1 was produced by coating granules of calcium hydroxide and an ion exchanger with a polymethacrylic acid ester.

In Table 1, the polyol was a mixture of an aromatic diamine type polyetherpolyol and an ethylenediamine type polyetherpolyol having a total hydroxyl value of 460 mgKOH/g. The foam stabilizer was F-335 manufactured by Shin-Etsu Chemical Industry Co., Ltd. (Tokyo). The catalyst was KAOLIZER No.31 manufactured by Kao Corporation (Tokyo). The blowing agent was cyclopentane. The carbon dioxide adsorbents were produced by using a reagent of calcium hydroxide having an average particle diameter of 50 $\mu$m, manufactured by Katayama Kagaku Kogyo Co., Ltd. (Osaka), as the powders of the alkaline-earth metal hydroxide. And the carbon dioxide adsorbents were produced by using an ion exchange resin SUMIKA-ION KA-890 having an average particle diameter of 100 $\mu$m, manufactured by Sumitomo Chemical Co., Ltd. (Osaka), soaked with the same weight of water as its own weight as the water absorbing powders. The carbon dioxide adsorbent was produced by granulating in a wet spray coating; the wet spray coating uses a centrifugal rotary fluid bed coater and granulator manufactured by Freund Industrial Co., Ltd. (Tokyo). Further, using the same apparatus, an organic coating composition containing a methacrylic acid ester as a main ingredient up to an average membrane thickness of 2 $\mu$m was formed. These materials, in compounding amounts shown in Table 1, were mixed to a premix.

The wet spray coating is a process in which granules are produced by dispersing a powdery material used as a core in a container, scattering organic solution of a resin thereon from a spraying apparatus, in order to adhere the resin to the core.

Details of 10 parts by weight for the carbon dioxide adsorbent in Example 1 formulation in Table 1 consisted of 6 parts by weight of calcium hydroxide, 3 parts by weight of wet ion exchanger and 1 part by weight of the polymethacrylic acid ester.

The polyisocyanate used in Example 1 and Comparative Examples 1 to 3 was polymeric MDI (diphenylmethane diisocyanate) having an amine equivalent of 135.

The compounded and mixed premix and the polyisocyanate in predetermined amounts were mixed and agitated. Then they were foamed and filled into a space formed between the box-shaped inner shell and box-shaped outer

TABLE 1

| | | | Ex. 1 | Comparative Ex. 1 | Comparative Ex. 2 | Comparative Ex. 3 |
|---|---|---|---|---|---|---|
| Amounts of raw materials in parts by weight | Premix composition | Polyol | 100 | 100 | 100 | 100 |
| | | Catalyst | 3 | 3 | 3 | 3 |
| | | Foam stabilizer | 2 | 2 | 2 | 2 |
| | | Cyclopentane | 10 | 10 | 10 | 10 |
| | | Pure water | 2 | 2 | 2 | 2 |
| | | Carbon dioxide adsorbent | | | | |
| | | ⎧ Ex. 1 formulation | 10 | — | — | — |
| | | ⎨ Calcium hydroxide alone | — | — | 10 | — |
| | | ⎩ Zeolite | — | — | — | 10 |
| | Polyisocyanate | | 154 | 154 | 154 | 154 |
| Properties of polyurethane foam | | Density (kg/m$^3$) | 35 | 34 | 35 | 45 |
| | | Thermal conductivity(kcal/mh °C.) | 0.0147 | 0.0160 | 0.0161 | 0.0159 |
| | | Composition of gas in cells (%) | | | | |
| | | ⎧ Carbon dioxide | 50 | 75 | 75 | 70 |
| | | ⎩ Cyclopentane | 50 | 25 | 25 | 30 | shell by using of a high pressure foaming machine (temperature of the raw material: 20° C.; discharging pressure: $1.2 \times 10^7$ Pa). As the result, thermal insulation cabinet was obtained.

The thermal insulation cabinet manufactured by the above-mentioned manner was broken up on the next day and a sample of rigid polyurethane foam was cut out from the thermal insulating foamed material in the thermal insulation cabinet. And the sample was assayed for density, thermal conductivity and gas composition in the cells at 24 hours after foaming. The results are shown in Table 1. The thermal conductivity was measured by means of AUTO-A manufactured by EKO Instruments Trading Co., Ltd. (Tokyo). The gas composition in the cells was determined by means of a gas chromatography apparatus manufactured by Shimadzu Corporation (Kyoto).

Further, the results are also shown in Table 1 for experiments in which no carbon dioxide adsorbent was used (Comparative Example 1), calcium hydroxide alone was used as the carbon dioxide adsorbent (Comparative example 2) and zeolite, the conventional adsorbent, was used as the carbon dioxide adsorbent (Comparative Example 3), for comparison purpose.

As is clear in Table 1, the thermal insulating foamed material in Example 1 had much improved thermal insulation properties in thermal conductivity as compared with those in Comparative Examples 1 to 3. As to the reason, it is considered that a decrease in the amount of carbon dioxide is the factor, as is evident from the results of determining gas composition in the cells. Besides, no decrease in expansion ratio of the foam was observed for the thermal insulating foamed material in Example 1, as is evident from the density of the foam, indicating that no problem existed in the process of foaming.

On the other hand, in Comparative Example 2, while problem did not exist in the process of foaming, the thermal conductivity was high as compared with that for the thermal insulating foamed material in Example 1. As to the reason, it is considered that, after foaming, there is almost no water was remained in the foam and calcium hydroxide alone could not exert effectively the ability of adsorbing carbon dioxide.

Further, in Comparative Example 3 in which zeolite was used, while content of carbon dioxide was somewhat decreased, no improvement was noted in thermal conductivity, and it was revealed that the density of the foam was greatly increased. It is considered that zeolite absorbed water in the raw materials just when it was mixed into the raw materials, and water did not act as a blowing agent. This allowed increase in density of the foam and, together with an adverse effect for solid thermal conductivity, inhibited improvement in thermal conductivity for the foam.

As mentioned above, the thermal insulating foamed material and the thermal insulation cabinet filled with said thermal insulating foamed material mentioned in Example 1 use granules as a carbon dioxide adsorbent, which is produced by mixing and granulating calcium hydroxide having a lower water absorbing property and organic powders having a water absorbing property and soaked with water in advance, and coating the surface of the granulated material with a resin. Therefore, the carbon dioxide adsorbent does not adsorb water in the premix and problems such as decrease in the expansion ratio of the foam does not exist. Further, since calcium hydroxide is in a state contacting with a substance soaked with water, it can exert carbon dioxide adsorbing ability even in the foam after losing water.

Furthermore, since the carbon dioxide adsorbent in Example 1 is coated by the resin, there is no risk of diffusing water newly generated in the course of the reaction of calcium hydroxide and carbon dioxide.

Accordingly, the thermal insulating foamed material and the thermal insulation cabinet using said thermal insulating foamed material mentioned in Example 1 do not adversely affect the properties of the foam and the carbon dioxide in the cells of the foam is removed allowing improvement of the thermal insulating property of the foam.

As mentioned above, the thermal insulating foamed material and the thermal insulation cabinet using said thermal insulating foamed material mentioned in Example 1 are of high quality with a high thermal insulating ability and without any problem for properties of the foam utilizing cyclopentane, which is one of hydrocarbons completely free from an ozone depletion and almost no effect to the global warming; and hence they are essential for the protection of global environment as the blowing agent for polyurethane foam.

While calcium hydroxide was used as a carbon dioxide adsorbent in Example 1, any powders of alkali metal hydroxide or alkaline-earth metal hydroxide, such as potassium hydroxide and the like, can be used with the same effects as Example 1. Further, while an ion exchange resin was used as the water carrying substance in Example 1, any water absorbing material, irrespective of organic or inorganic, can be used with the same effects as those in Example 1.

Besides, the same effects as those in Example 1 can also be obtained using a carbon dioxide adsorbent produced by granulating powders of an alkali metal hydroxide or an alkaline-earth metal hydroxide using an organic or inorganic substance containing water as a binder, and coating the surface of the granulated material with a resin which is permeable to carbon dioxide but hardly permeable to water. Furthermore, in such Example used organic or inorganic as a binder, since the step for humidifying the water carrying substance and the step for mixing with the powders of an alkali metal hydroxide or the like in Example 1 become unnecessary, there may be an advantage that the costs for production could be lowered.

The thermal insulating foamed material having the carbon dioxide adsorbents mentioned in Example 1 has an advantage that carbon dioxide is removed by the carbon dioxide adsorbent and without adverse effect to the expansion ratio of the foam, because the carbon dioxide adsorbent never adsorb water in the materials for the foam.

EXAMPLE 2

A thermal insulating foamed material having carbon dioxide adsorbents, and a thermal insulation cabinet using said thermal insulating foamed material of Example 2 in accordance with the present invention are specifically mentioned below referring to FIG. 1 and FIG. 2.

FIG. 1 shows a schematic view of a carbon dioxide adsorbent mentioned in Example 2. FIG. 2 shows a sectional view of a thermal insulation cabinet mentioned in Example 2.

The carbon dioxide adsorbent 8 shown in FIG. 1 has a composition in which an alkaline-earth metal hydroxide 1 and a hydrate 2 of inorganic compound having a heat of hydration of 20 kcal/mol or more are finely granulated and then are formed to granules of desired sizes using a resin 3 as a binder and the surface of the granulated materials is coated. The carbon dioxide in the cells of the thermal insulating foamed material permeates through the resin 3, and is dissolved in the hydrate 2 of inorganic compound. And further, the carbon dioxide has reactions to the alkaline-earth metal hydroxide 1 thereby fixing carbon dioxide.

Figure 2:
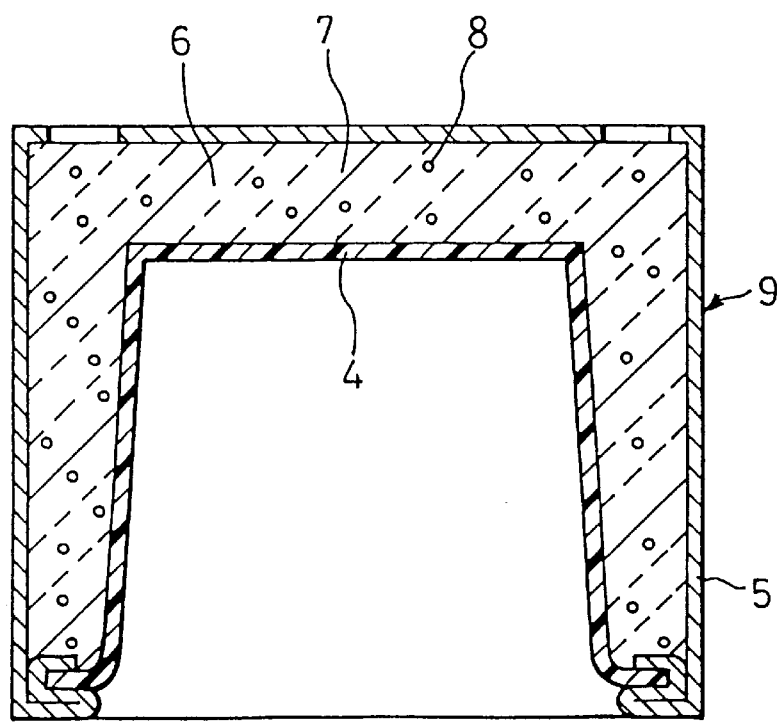
FIG. 2 shows a sectional view of a thermal insulation cabinet mentioned in Example 2 of the present invention.

The thermal insulation cabinet 9 shown in FIG. 2 is manufactured by filling thermal insulating foamed material 7 in the space 6 between the box-shaped inner shell 4 and box-shaped outer shell 5. The thermal insulating foamed material 7 has the carbon dioxide adsorbent 8 dispersed therein.

Table 2 shows the compositions of the raw materials for the foam in Example 2 and Comparative Examples 4 to 6, and properties of the manufactured foam, i.e. density, thermal conductivity and composition of gas in cells.

The carbon dioxide adsorbent in Example 2 was produced by coating aggregated granules of calcium hydroxide and magnesium chloride hexahydrate with polymethacrylic acid ester.

The compounded and mixed premix and the polyisocyanate in predetermined amounts were mixed and agitated. Then they were foamed and filled into the space 6 formed between the box-shaped inner shell 4 and box-shaped outer shell 5 by using of a high pressure foaming machine (temperature of the raw material: 20° C.; discharging pressure: $1.2 \times 10^7$ Pa). As the result, the thermal insulation cabinet 9 of Example 2 was obtained.

The thermal insulation cabinet manufactured by the above-mentioned manner was broken up on the next day and a sample of rigid polyurethane foam was cut out from the thermal insulating foamed material 7 in the thermal insulation cabinet 9. And the sample was assayed for density, thermal conductivity and gas composition in the cells at 24 hours after foaming. The results are shown in Table 2. The thermal conductivity was measured by means of AUTO-A manufactured by EKO Instruments Trading Co., Ltd. The gas composition in the cells was determined by means of a gas chromatography apparatus manufactured by Shimadzu Corporation.

TABLE 2

| | | | Ex. 2 | Comparative Ex. 4 | Comparative Ex. 5 | Comparative Ex. 6 |
|---|---|---|---|---|---|---|
| Amounts of raw materials in parts by weight | Premix composition | Polyol | 100 | 100 | 100 | 100 |
| | | Catalyst | 3 | 3 | 3 | 3 |
| | | Foam stabilizer | 2 | 2 | 2 | 2 |
| | | Cyclopentane | 10 | 10 | 10 | 10 |
| | | Pure water | 2 | 2 | 2 | 2 |
| | | Carbon dioxide adsorbent | | | | |
| | | Ex. 2 formulation | 10 | — | — | — |
| | | Calcium hydroxide alone | — | — | 10 | — |
| | | Zeolite | — | — | — | 10 |
| | Polyisocyanate | | 154 | 154 | 154 | 154 |
| Properties of polyurethane foam | | Density (kg/m$^3$) | 35 | 34 | 35 | 45 |
| | | Thermal conductivity(kcal/mh °C.) | 0.0147 | 0.0160 | 0.0161 | 0.0159 |
| | | Composition of gas in cells (%) | | | | |
| | | Carbon dioxide | 50 | 75 | 75 | 70 |
| | | Cyclopentane | 50 | 25 | 25 | 30 | the catalyst and the blowing agent, the same raw materials as the aforementioned materials in Example 1 were used.

The carbon dioxide adsorbent 8 were produced by using a reagent of calcium hydroxide having an average particle diameter of 50 μm, manufactured by Katayama Kagaku Kogyo Co., Ltd., as the powders of the alkaline-earth metal hydroxide and magnesium chloride hexahydrate having a heat of hydration of 33.11 kcal/mol manufactured by Wako Pure Chemical Industries Ltd. as a metal hydrate. The carbon dioxide adsorbent 8 was produced by granulating in wet spray coating; the wet spray coating uses the centrifugal rotary fluid bed coater and granulator manufactured by Freund Industrial Co., Ltd. and a resin mainly consisting of methacrylic acid ester as a binder. Further, using the same apparatus, a film-coating having an average membrane thickness of 2 μm was formed.

These materials mentioned above, in compounding amounts shown in Table 2, were mixed to a premix.

Details of 10 parts by weight for the carbon dioxide adsorbent 8 in Example 2 formulation in Table 2 consisted of 6 parts by weight of calcium hydroxide, 3 parts by weight of magnesium chloride hydrate and 1 part by weight of the polymethacrylic acid ester.

The polyisocyanate used in Example 2 and Comparative Examples 4 to 6 was polymeric MDI having an amine equivalent of 135.

Further, the results are also shown in Table 2 for experiments in which no carbon dioxide adsorbent was used (Comparative Example 4), calcium hydroxide alone was used as the carbon dioxide adsorbent (Comparative example 5) and zeolite, the conventional adsorbent, was used as the carbon dioxide adsorbent (Comparative Example 6), for comparison purpose.

As is clear in Table 2, the thermal insulating foamed material in Example 2 had a much improved thermal conductivity as compared with those in Comparative Examples 4 to 6. As to the reason, it is considered that a decrease in the amount of carbon dioxide is the factor, as is evident from the results of determining gas composition in the cells. Besides, no decrease in expansion ratio of foam was observed for the thermal insulating foamed material in Example 2 in comparison with each Comparative Example, as is evident from the density of the foam, indicating that no problem existed in the process of foaming.

On the other hand, the product in Comparative Example 5 had the same density as that in Example 2, as shown in the density of the foam in Table 3, and no problem existed in the process of foaming. However, the thermal conductivity of the product in Comparative Example 5 was high in comparison with that in Example 2. As to the reason, it is considered that, after foaming, there is almost no water was remained in the foam and calcium hydroxide could not exert effectively the ability of adsorbing carbon dioxide.

Further, in Comparative Example 6 in which zeolite was used, while content of carbon dioxide was somewhat decreased, no improvement was noted in thermal conductivity, and it was revealed that the density was greatly increased. As to the reason, it is considered that zeolite absorbed water in the raw materials just when it was mixed into the raw materials and therefore water did not act as a blowing agent. This allowed increase in density of the foam and, together with an adverse effect for solid thermal conductivity, inhibited improvement in thermal conductivity for the foam.

As mentioned above, the carbon dioxide adsorbent in Example 2 produced by mixing and forming to granules of calcium hydroxide and magnesium chloride hexahydrate followed by coating the surface of the granulated material with a resin, which is permeable to carbon dioxide but hardly permeable to water. Therefore, it is possible to granulate without vaporizing water in the hydrate. In addition, by using such carbon dioxide adsorbent in the thermal insulating foamed material, the carbon dioxide adsorbent does not adsorb water in the premix and problems such as decrease in the expansion ratio of the foam does not exist. Further, since calcium hydroxide in the carbon dioxide adsorbent is in a state contacting with a substance soaked with water, it can exert carbon dioxide adsorbing ability even in the foam after losing water. Furthermore, since the carbon dioxide adsorbent is coated by the resin, there is no risk of diffusing water newly generated in the course of the reaction of calcium hydroxide and magnesium chloride with carbon dioxide.

While calcium hydroxide was used as a carbon dioxide adsorbent in Example 2, any powders of alkali metal hydroxide or alkaline-earth metal hydroxide, such as potassium hydroxide and the like, can be used with the same effects as those in Example 2. Further, while magnesium chloride hexahydrate was used as the hydrate of inorganic compound in Example 2, other inorganic or metal hydroxides such as barium hydroxide octahydrate, sodium carbonate decahydrate and the like, preferably an inorganic or metal hydrate having a heat of hydration of 20 kcal/mol or more, can be used with the same effects as those in Example 2.

EXAMPLE 3

A thermal insulating foamed material having carbon dioxide adsorbents, and a thermal insulation cabinet using the thermal insulating foamed material of Example 3 in accordance with the present invention are specifically mentioned below referring to FIG. 3 to FIG. 5.

Figure 3:
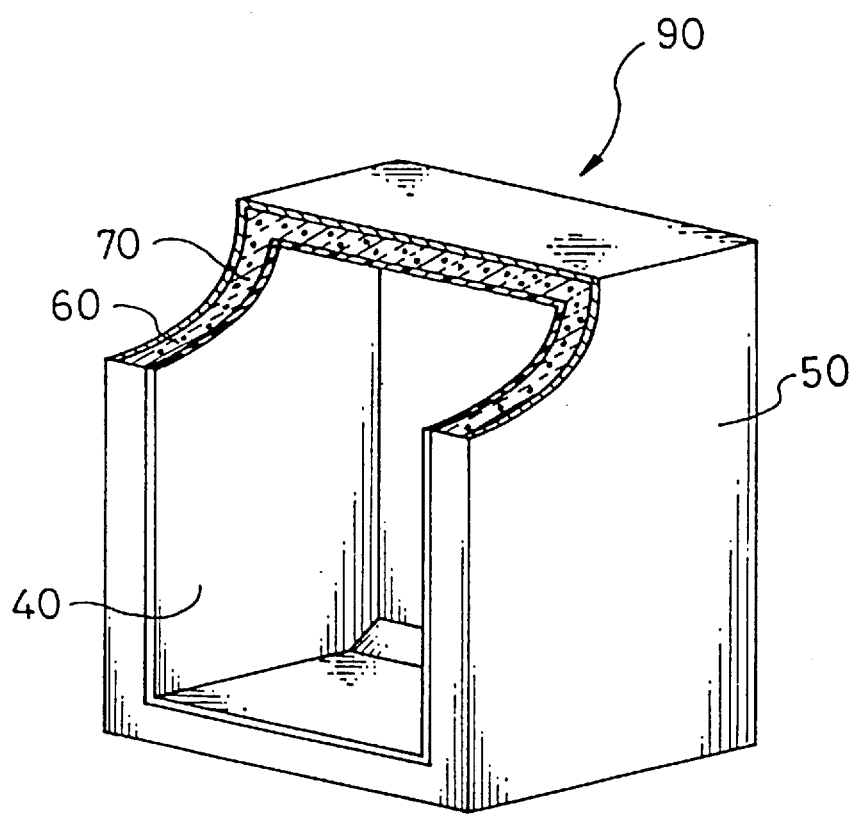
FIG. 3 shows a sectional view, partly cut away, of a thermal insulation cabinet mentioned in Example 3 of the present invention.

FIG. 3 shows a sectional view, partly cut away, of the thermal insulation cabinet mentioned in Example 3. FIG. 4 shows a sectional view of the thermal insulation cabinet mentioned in Example 3 directly before filling raw materials. FIG. 5 shows a sectional view of the thermal insulation cabinet mentioned in Example 3 after filling the raw materials.

In FIG. 3, the thermal insulation cabinet 90 has a box-shaped outer shell 50 as the first wall member, a box-shaped inner shell 40 as the second wall member and a thermal insulating foamed material 70 filled in the space 60 between the box-shaped inner shell 40 and box-shaped outer shell 50. The thermal insulating foamed material 70 has the carbon dioxide adsorbents 80 dispersed therein.

Further, the thermal insulation cabinet 90 in accordance with Example 3 is produced by filling the thermal insulating foamed materials in the space 60 between the box-shaped outer shell 50 as the first wall member and the box-shaped inner shell 40 as the second wall member. Then the polyol, the catalyst, the foam stabilizer, the material containing at least water as a composition for the blowing agent, said carbon dioxide adsorbent 80 coated by the resin and the polyisocyanate are mixed and agitated, and filled in the space 60, in order to produce the thermal insulating foamed material 70 by foaming.

Table 3 shows the compositions of the raw materials for the foam in Example 3 and Comparative Examples 7 and 8, and properties of the manufactured foam, i.e. density, thermal conductivity and composition of gas in cells.

The carbon dioxide adsorbents in Example 3 were produced by coating granules of calcium hydroxide with a polyvinyl acetate resin after soaking with 0.01 molar equivalent of water.

TABLE 3

|  |  |  | Ex. 3 | Comparative Ex. 7 | Comparative Ex. 8 |
|---|---|---|---|---|---|
| Amounts of raw materials in parts by weight | Premix composition | Polyol | 100 | 100 | 100 |
|  |  | Catalyst | 3 | 3 | 3 |
|  |  | Foam stabilizer | 2 | 2 | 2 |
|  |  | Cyclopentane | 8 | 8 | 8 |
|  |  | Pure water | 2 | 2 | 2 |
|  |  | Carbon dioxide adsorbent |  |  |  |
|  |  | { Ex. 3 formulation | 30 | — | — |
|  |  | { Absorbent without soaking water | — | — | 10 |
|  | Polyisocyanate |  | 154 | 154 | 154 |
| Properties of polyurethane foam |  | Density (kg/m$^3$) | 39 | 39 | 35 |
|  |  | Thermal conductivity(kcal/mh °C.) | 0.0145 | 0.0162 | 0.0162 |
|  |  | Composition of gas in cells (%) |  |  |  |
|  |  | { Carbon dioxide | 50 | 75 | 75 |
|  |  | { Cyclopentane | 50 | 25 | 25 |

In the premix, the polyol was a polyetherpolyol, having a hydroxyl value of 460 mgKOH/g, produced by addition polymerization of an aromatic diamine with an alkylene diamine as an extender. The catalyst for promoting a reaction of the polyol and the isocyanate was KAOLIZER No.1 (N,N,N',N'- tetramethyl hexamethylenediamine) manufactured by Kao Corporation. The foam stabilizer was F-337, a silicone foam stabilizer, manufactured by Shin-Etsu Chemical Industry Co., Ltd.. The blowing agent was cyclopentane and water. They were mixed in a composition shown in Table 3.

Details of 30 parts by weight for the carbon dioxide adsorbent 80 in Example 3 formulation in Table 3 consisted of 27 parts by weight of calcium hydroxide, 3 parts by weight of polyvinyl acetate.

The carbon dioxide adsorbent 80 in Example 3 was produced by soaking calcium hydroxide with 0.01 molar equivalent of water and then applying a film-coating of polyvinyl acetate in the wet spray coating process.

The polyisocyanate used in Example 3 and Comparative Examples 7 and 8 was polymeric MDI (diphenylmethane diisocyanate) having an amine equivalent of 135.

Figure 4:
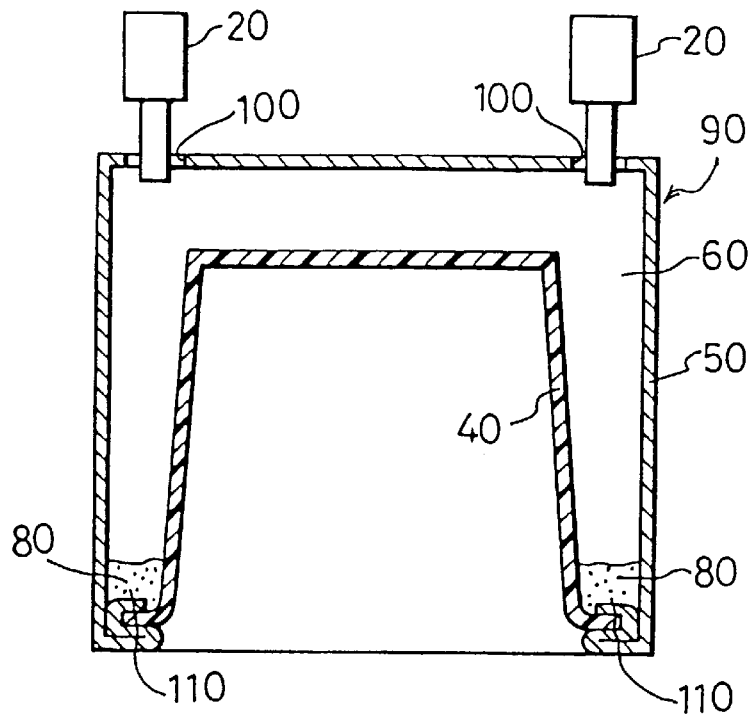
FIG. 4 shows a sectional view of the thermal insulation cabinet directly before filling raw materials in Example 3 of the present invention.
Figure 5:
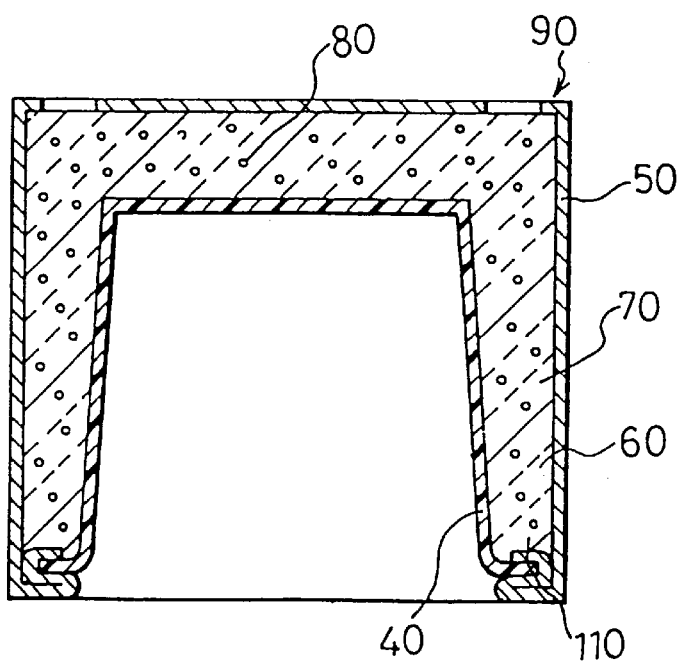
FIG. 5 shows a sectional view of the thermal insulation cabinet after filling raw materials in Example 3 of the present invention.

Immediately before filling raw materials to the thermal insulation cabinet 90 shown in FIG. 4, a mixture is prepared by mixing and agitating the premix and the polyisocyanate in predetermined amounts by means of a high pressure foaming machine (not shown). The mixture is filled from discharge heads 20 into a space 60 formed between the box-shaped inner shell 40 and box-shaped outer shell 50 through inlets 100 for filling. In a flange 110 of the cabinet under the inlets 100 for filling, granules of the carbon dioxide adsorbent 80 are placed in advance.

The materials discharged from the discharge heads 20 is filled into the space 60 catching the carbon dioxide adsorbent 80 and uniformly mixing. The polyurethane foam, which is the thermal insulating foamed material 70 as filled, is hardened as the time proceeds, upon which the thermal insulation cabinet 90 was obtained.

The thermal insulation cabinet 90 thus obtained was of high quality without problems in external appearance such as deformation or the like. The thermal insulation cabinet 90 was broken up on the next day and a sample of the rigid polyurethane foam was taken. The sample of the rigid polyurethane foam was assayed for density of the foam, thermal conductivity of the foam and gas composition in the cells at 24 hours after foaming. The results are shown in Table 3.

In Table 3, results are also shown for density, thermal conductivity and gas composition in cells measured for a rigid polyurethane foam formed using a carbon dioxide adsorbent produced by film-coating calcium hydroxide without soaking water, as Comparative Example 7.

Further, the results are also shown in Table 3 for density, thermal conductivity and as composition in cells for a rigid polyurethane foam formed without using carbon dioxide adsorbent, as Comparative Example 8.

As is clear in Table 3, the thermal insulating foamed material 70 in Example 3 had a much decreased ratio of carbon dioxide in the gas composition in the cells and an improvement by about 10% in thermal conductivity of the rigid polyurethane foam as compared with those in Comparative Examples 8 in which no carbon dioxide adsorbent was added.

Also, in Comparative Example 7 in which the polyurethane foam was formed using a carbon dioxide adsorbent film-coated with the polyvinyl acetate resin without soaking with water, neither decrease in ratio of carbon dioxide nor improvement in thermal conductivity of the foam was observed.

While calcium hydroxide was used as the carbon dioxide adsorbent in above Example 3, the same effects as those in Example 3 can be obtained by using potassium hydroxide, sodium hydroxide, barium hydroxide or a mixture thereof. Further, it is also possible to use a carbon dioxide adsorbent produced by film-coating an oxide such as calcium oxide with a resin composition after soaking with more than 1 milli-molar equivalent of water.

As a resin composition for film-coating, an acrylic resin, a urethane resin and the like can be utilized in a manner similar to the vinyl resin.

As mentioned above, the thermal insulation cabinet having with the thermal insulating foamed material in Example 3 is extremely useful as a cabinet for a refrigerator or a freezer and can impart a quality as an excellent thermal insulation cabinet.

Although the present invention has been mentioned in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A thermal insulating foamed material, which comprises a foamed polyurethane resin composition having closed cells, which has therein carbon dioxide adsorbents formed by at least one member of carbonates of alkali metal and carbonates of alkaline-earth metal, covered with resin coating, and has volatile blowing agent in said closed cells.

2. A thermal insulating foamed material in accordance with claim 1, wherein said carbon dioxide adsorbent has at least one member of hydroxides of alkali metal and hydroxides of alkaline-earth metal forming a mixture with said carbonates of alkali metal or said carbonate of alkaline-earth metal.

3. A thermal insulating foamed material in accordance with claim 1, wherein said carbon dioxide adsorbent contains water within said resin coating.

4. A thermal insulating foamed material in accordance with claim 1, wherein said carbon dioxide adsorbent is formed with a coating resin film, which is permeable to carbon dioxide but hardly permeable to water.

5. A thermal insulating foamed material in accordance with claim 1, wherein said carbon dioxide adsorbent is formed with a coating resin film consisting of at least one member selected from the group consisting of polyvinyl alcohol, polyvinyl acetate, polyvinyl pyrrolidone, polyacrylic acid ester, polymethacrylic acid ester, ethyl cellulose, and carboxymethyl ethyl cellulose.

6. A thermal insulating foamed material in accordance with claim 1, wherein said carbon dioxide adsorbent has an outer dimension of from 0.2 mm to 1.0 mm.

7. A thermal insulation cabinet comprising:
a first wall member,
a second wall member and
a foamed polyurethane resin composition which is filled in a space formed between said first wall member and said second wall member, has therein carbon dioxide adsorbents formed by at least one member of carbonates of alkali metal and carbonates of alkaline-earth metal, covered with resin coating, and has volatile blowing agent in closed cells of said foamed polyurethane resin composition.

8. A thermal insulation cabinet in accordance with claim 7, wherein said carbon dioxide adsorbent further contains at least one member of hydroxides of alkali metal and hydroxides of alkaline-earth metal forming a mixture with said carbonates of alkali metal or said carbonates of alkaline-earth metal.

9. A thermal insulation cabinet in accordance with claim 7, wherein said carbon dioxide adsorbent contains water within said resin coating.

10. A thermal insulation cabinet in accordance with claim 7, wherein said carbon dioxide adsorbent is formed with a coating resin film, which is permeable to carbon dioxide but hardly permeable to water.

11. A thermal insulation cabinet in accordance with claim 7, wherein said carbon dioxide adsorbent is formed with a coating resin film of at least one member selected from the group consisting of polyvinyl alcohol, polyvinyl acetate, polyvinyl pyrrolidone, polyacrylic acid ester, polymethacrylic acid ester, ethyl cellulose, and carboxymethyl ethyl cellulose.

12. A thermal insulation cabinet in accordance with claim 7, wherein said carbon dioxide adsorbent has an outer dimension of from 0.2 mm to 1.0 mm.

13. A thermal insulating foamed material in accordance with claim 2, wherein said carbon dioxide adsorbent contains water within said resin coating.

14. A thermal insulating foamed material in accordance with claim 2, wherein said carbon dioxide adsorbent is formed with a coating resin film, which is permeable to carbon dioxide but hardly permeable to water.

15. A thermal insulating foamed material in accordance with claim 2, wherein said carbon dioxide adsorbent is formed with a coating resin film consisting of at least one member selected from the group consisting of polyvinyl alcohol, polyvinyl acetate, polyvinyl pyrrolidone, polyacrylic acid ester, polymethyacrylic acid ester, ethyl cellulose, and carboxymethyl ethyl cellulose.

16. A thermal insulating foamed material in accordance with claim 2, wherein said carbon dioxide adsorbent has an outer dimension of from 0.2 mm to 1.0 mm.

17. A thermal insulation cabinet in accordance with claim 8, wherein said carbon dioxide adsorbent contains water within said resin coating.

18. A thermal insulation cabinet in accordance with claim 8, wherein said carbon dioxide adsorbent is formed with a coating resin film, which is permeable to carbon dioxide but hardly permeable to water.

19. A thermal insulation cabinet in accordance with claim 8, wherein said carbon dioxide adsorbent is formed with a coating resin film of at least one member selected from the group consisting of polyvinyl alcohol, polyvinyl acetate, polyvinyl pyrrolidone, polyacrylic acid ester, polymethacrylic acid ester, ethyl cellulose, and carboxymethyl ethyl cellulose.

20. A thermal insulation cabinet in accordance with claim 8, wherein said carbon dioxide adsorbent has an outer dimension of from 0.2 mm to 1.0 mm.

* * * * *